March 9, 1948. R. A. COLE ET AL 2,437,242
TELEMETERING TRANSMITTER
Filed April 29, 1946 3 Sheets-Sheet 1
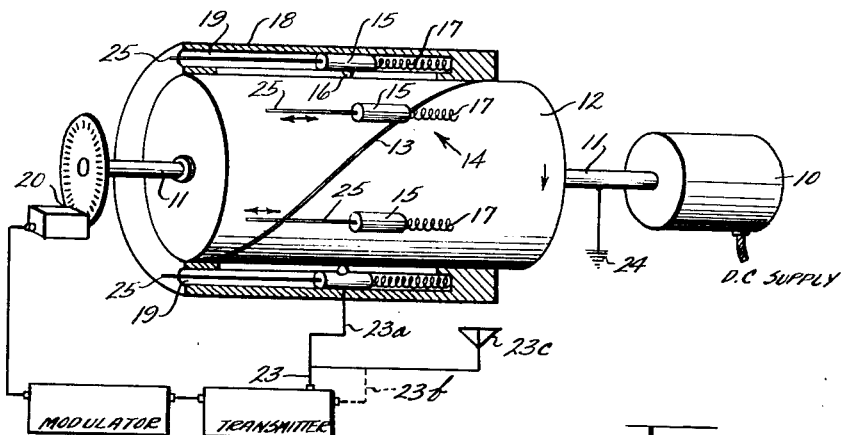
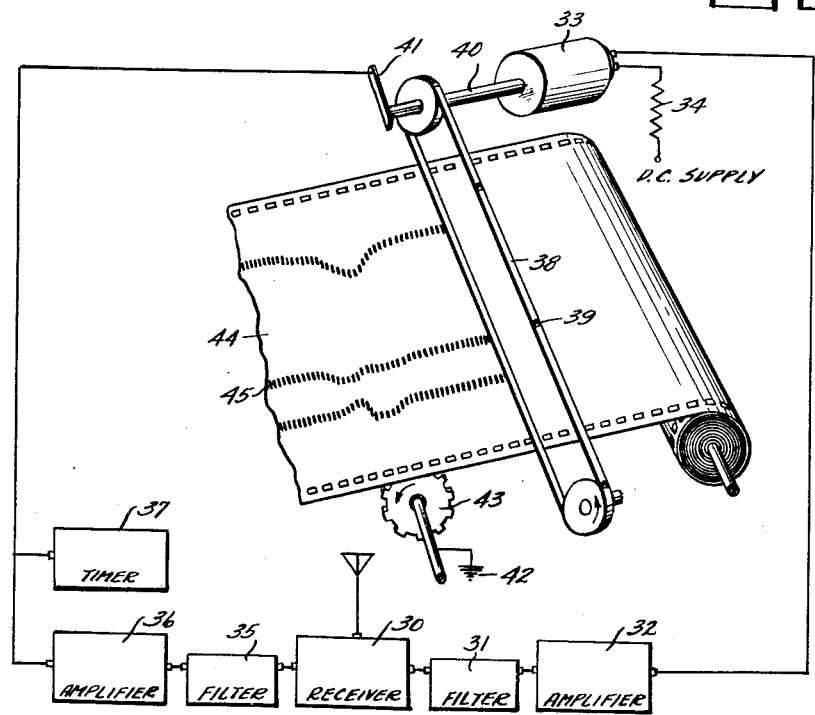
INVENTORS
ROBERT A. COLE
DONALD I. SMITH
BY
ATTORNEYS

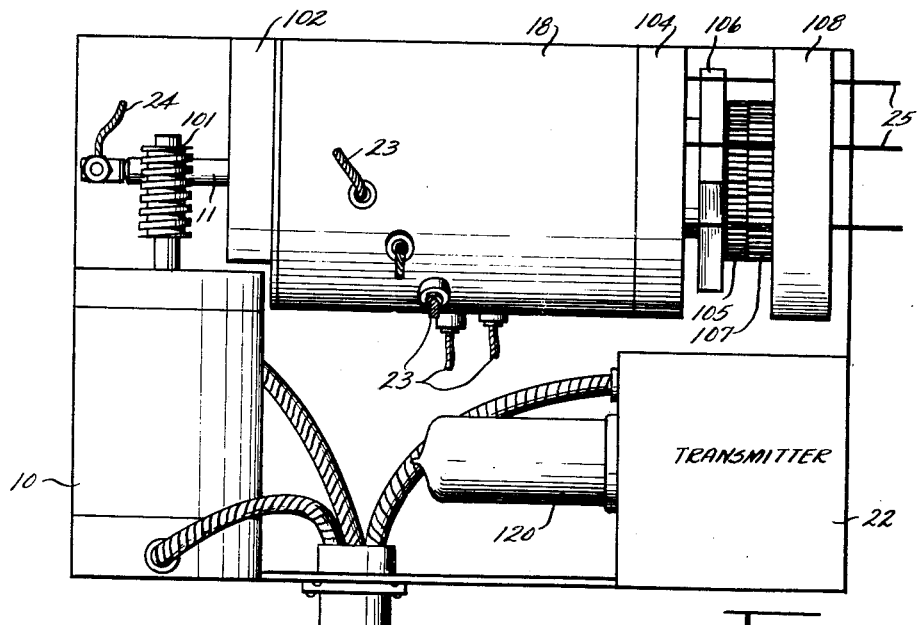
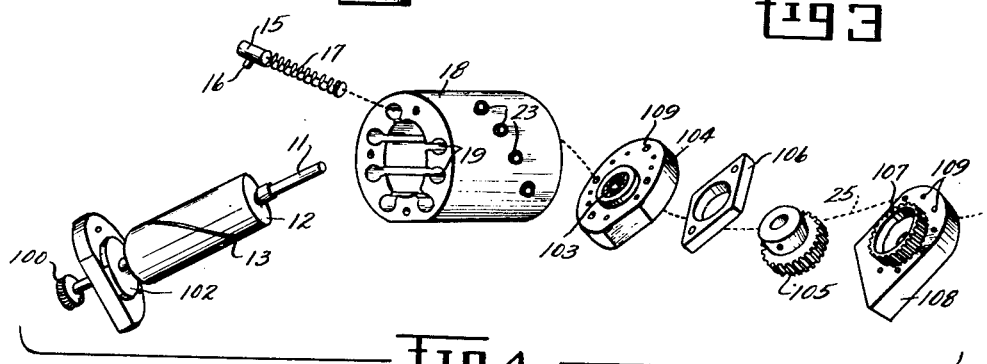
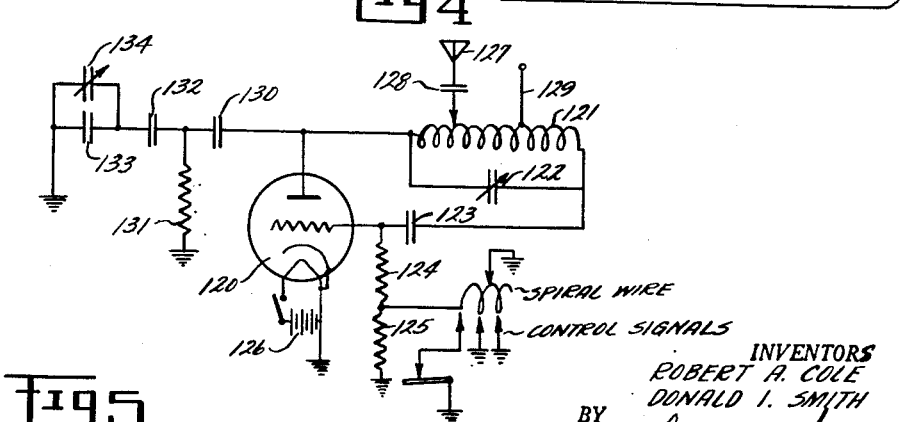

Patented Mar. 9, 1948

2,437,242

UNITED STATES PATENT OFFICE 2,437,242

TELEMETERING TRANSMITTER

Robert A. Cole, Moline, Ill., and Donald I. Smith, Vincent, Ohio

Application April 29, 1946, Serial No. 665,710

6 Claims. (Cl. 177—380)

(Granted under the act of March 3, 1883, as amended April 30, 1928; 370 O. G. 757)

The invention described herein may be manufactured and used by or for the Government for governmental purposes without the payment to us of any royalty thereon.

This invention relates to a telemetering apparatus and method which is adapted to transmit by radio, the indications and behavior of a multiplicity of instruments, for example, those used on test aircraft. It may also be used to transmit indications of the positions of airfoil surfaces, or whether servo motors are "on" or "off."

One of the objects of the invention is to provide a system of this class which will produce a graphic record of the behavior of a condition or motion to be telemetered directly and comparatively with other conditions simultaneously telemetered so that the graphs may be compared for any given instant or interval of time.

Another object is to provide an apparatus which uses no ink for recording. Inks are objectionable because of exhaustion, freezing, premature drying and many other reasons.

A further object is to provide a method of signal generation in which momentary interruptions of a carrier wave will be sent out in a series and the position of the interruptions to each other will be proportional to the motion or condition being telemetered. Such momentary interruption does not interfere with the synchronization signal because of its short duration. Other objects, such as the provision of a simple, compact apparatus for accomplishing the above results will be evident from the context.

In the drawings,

Fig. 1 is a schematic view of the signal generating and transmitting equipment.

Fig. 2 is a schematic view of the receiving, amplifying and record-generating equipment.

Fig. 3 is a plan view of the actual signal generator and transmitter.

Fig. 4 is an exploded view of the signal generator.

Fig. 5 is a circuit diagram of the signal generator and transmitter.

TRANSMITTER

Schematic presentation

Figure 6:
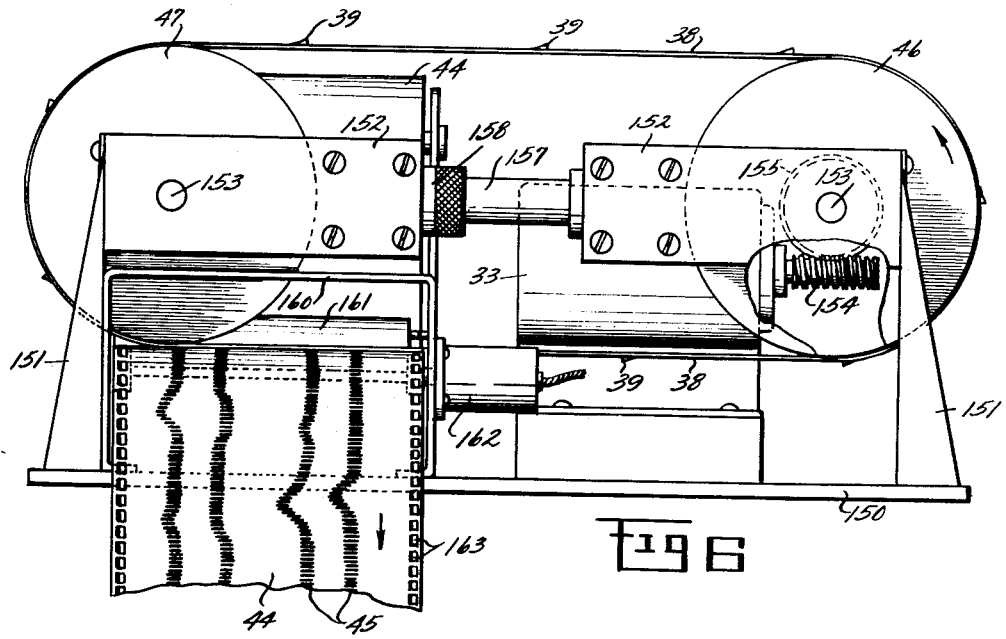
Fig. 6 is a side elevation of the actual receiver and recorder.
Figure 7:
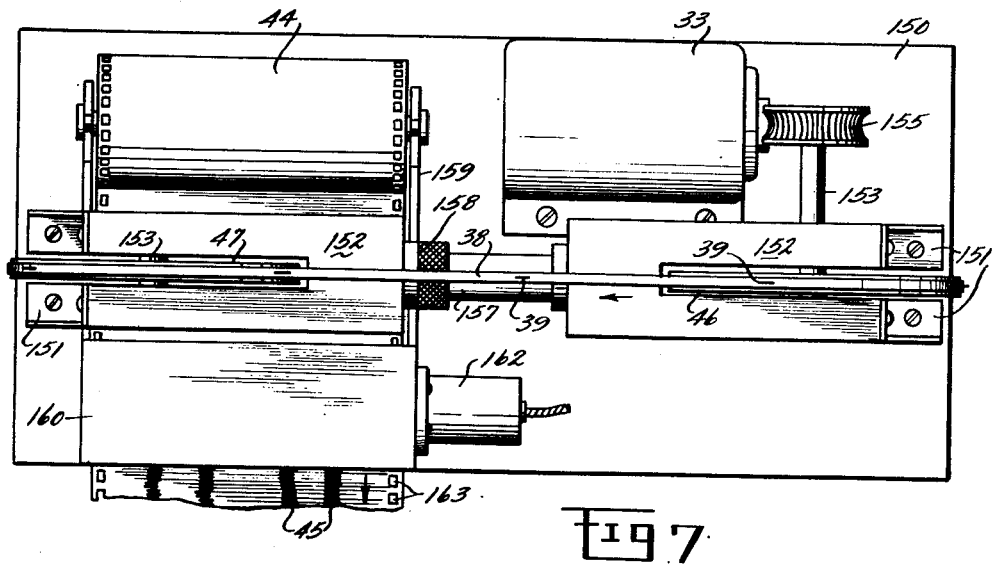
Fig. 7 is a plan view of the actual recorder.

In Fig. 1, a direct current motor 10 drives a shaft 11 upon which is mounted a drum 12 for concentric rotation. The drum is made of insulating material such as synthetic resin plastic or vulcanized fiber. A helix 13 of conductive material preferably flat copper wire, is inlaid into the drum so as to be wrapped about the cylinder thru 360° and is grounded to shaft 11. Mounted about the periphery of cylinder 12 at preferably, but not necessarily, the middle point of its length, there are a multiplicity of linearly movable contacts 14. Such contacts may have any suitable shape, but preferably they are made with a cylindrical portion 15 and a stylus portion 16. A coil spring 17, made preferably of beryllium copper, is connected co-axially with one end of cylinder 15 and the outer end of such spring abuts a solid immovable surface. Suitable connection is made to the other end of cylinder 15 to connect the motion to be telemetered with the latter. Spring 17 will then return cylinder 15 to the zero point after cessation of the telemetering motion which has displaced it either to the left or to the right of that point. All contacts 15—16 do not necessarily have the same zero point. An enveloping cylinder 18 having a number of longitudinal bores 19 for accommodating the movement of stylus 16 is used to house contact cylinders 15 and guide them in a straight line as the telemetering forces move it back and forth over the registering cylinder 12. All contacts 14 are connected electrically to separate leads 23 through transverse openings in the wall of cylinder 18.

At the free end of shaft 11 there is a tone generator 20, the pitch of which is proportional to the speed of motor 10. The tone, or audio frequency, is used to modulate a conventional radio transmitter 22 by means of a modulator 21. Any suitable place on the transmitter is tapped by a lead 23 to carry the modulated carrier wave to all contacts 14, altho there is no flow of such current thru the contacts 14 until they act to ground the carrier current thru helix 13 thence to shaft 11 which is provided with a ground 24. Normally the carrier current is delivered to antenna 23c thru lead 23b, this being one branch of output lead 23 from the transmitter. The other branch, 23a, connects with lead 19 which in turn connects all contacts 14.

It will be evident, therefore, that the transmitting system operates as follows: Motor 10 rotates shaft 11, cylinder 12 which is in effect a rotary switch and tone generator 20 at an identical high speed, which can be judged by the pitch of the tone. The styli 16 make contact serially with helix wire 13 at intervals which are determined by the longitudinal position of contacts 14 on cylinder 12. Such positions are in turn dependent upon the telemetering forces or motions impressed upon cylinders 15 of contacts 14 and the spring pressures or tensions which oppose them. The zero point is that at which no spring action is being exerted. Whenever a stylus 16 contacts the helix 13 and audio component of the carrier current will be grounded for an extremely short time too short to interfere with the synchronization signal. The marks upon sensitive paper at the receiving station, indicating such interruptions can be read by their positions and extent of separation to indicate the condition telemetered.

ACTUAL CONSTRUCTION OF SIGNAL GENERATOR

Referring now to Figs. 3, 4 and 5, it will be seen that the actual construction of the signal generator has been changed from that described in the schematic presentation so as to make the apparatus compact and rugged. Fig. 4 shows the few parts that are necessary to make up the mechanical assembly. Fig. 4 shows a simplification of the circuit brought about by the elimination of the tone generator and the addition of a high frequency oscillating tube and associated circuits.

In this construction shaft 11 carries upon its outer end a worm wheel 100 which is driven by a worm 101 which is in turn driven by motor 10. Drum 12 fits enveloping cylinder 18, its shaft being supported in fiber or synthetic resin bearings 102. The other end of the shaft is supported in ball bearings 103, supported in insulating block 104 which is attached to the end of cylinder 18. A spur gear 105 is mounted on shaft 11 and is supported in insulating block 106. It abuts a second spur gear 107 which is fixedly supported on an insulating block. The latter and block 104 are drilled with as many small holes 109 as there are bores 18a in cylinder 18. The holes and bores register. Their purpose is the accommodation of fine but strong wires 25 which connect the contacts 15 with the forces or positions to be telemetered. Conductors 23 connect the inner contacts 15 with the transmitter 22.

The gears 105 and 107 are in capacitative electrical relation, therefore, when gear 105, which is insulated from gear 107 revolves, the effect is that of a variable condenser. The capacity changes according to whether the teeth are opposite each other or opposite a trough. The change is superposed upon the basic capacity which resides inherently in the gears when they are considered as shaped masses of metal facing each other at a fixed distance and under fixed electrical conditions.

Referring now to Fig. 5, the circuit represents an oscillator employing a high frequency miniature oscillating tube 120 (type 6C4 preferred) in a tank circuit. 121 is the tank coil and its tank condenser is 122. Therefore the circuit is that of a self-excited oscillator feeding energy back to the tube grid through a condenser 123. Resistances 124 and 125 provide grid bias through grid current flow. The cathode of the tube is grounded. The filament is heated by a storage battery 126 or equivalent supply. An antenna 127 is attached to the tank coil 121 through a condenser 128 which insulates the antenna from the high voltage D. C. Contact 129 goes to the center top of the tank coil which is conventional in oscillator circuits. 130 is a fixed miniature mica condenser. A resistance 131 to ground is provided to earth any D. C. which might leak thru condenser 130. 132 is a fixed capacitance created by the proximity of collar or block 106 and gear 105. Capacitances 133 and 134 are created by gears 105 and 107 being in proximity, 133 being the fixed or basic capacitance and 134 the variable one caused by the rotation of the gears. Signals received by the helix 13 or 121 are collected to short out part of the grid bias resistor 125. Therefore these signals amplitude modulate the oscillator as well as frequency modulate it. However, the frequency modulation is the only part used. The carrier frequency amounts to about sixteen megacycles.

RECEIVER AND RECORDER

Schematic presentation

A conventional receiver 30 is divided as to its output. A portion is carried to a filter 31 which permits passage of the audio component of the carrier wave, i. e., the synchronization frequency. This output is amplified by an amplifier 32 and the amplifier output fed to a special motor 33. The latter is substantially an inverter (Bendix type No. 12117-2-B), but may alternatively be a synchronous motor. If an inverter is used (which is preferred), it is driven by its D. C. portion. A resistor 34 is provided in the D. C. supply to cause poor D. C. speed regulation. The amplified modulated carrier wave above referred to, is fed into the A. C. portion of the inverter and serves to hold it in proportional synchronism to the transmitting cylinder 12 and in exact synchronism with the mechanical transmitter, i. e., the tone generator.

Attached to the other output branch of receiver 30 is another filter 35 which permits the passage of impulses, but not of the synchronization frequency. An amplifier is also provided for this filtered signal and the output may be fed directly to a recorder 36 or preliminarily to a timing signal generator 37.

The recorder is essentially a thin metal band 38 of a length corresponding to or proportional to the diameter of cylinder 12. It passes over driver pulley 46 and driven pulley 47 and is provided on its periphery with equi-spaced contacts 39 or number equal to the number of contacts 14 of the transmitter. It is mounted on the drive shaft 40 of inverter 33. A spring-pressed contact 41 closes the circuit at the extreme end of shaft 40 beyond the point at which the recorder disc 38 is mounted.

Beneath the band 38, there is a continuous strip 44 of the sensitive paper known as "Teledeltos." It is a paper which becomes marked at that point at which an electric current passes thru it. The strip may be bent arcuately to touch the disc at the periphery contacts 39, thereby giving the strip a troughed shape. In this position the marks 45 made upon it are easy to read. Means, 43, for example, toothed wheels cooperating with slots in the paper margins may be used to move the paper continuously are provided.

Operation of the receiver-recorder is as follows: D. C. from mains is applied to the D. C. side of inverter 33. This force does most of the driving. The poor speed regulation caused by the resistor 34 renders the D. C. motor susceptible to speed control by its A. C. side. That side tends to run in synchronism with the filtered audio component supplied to it by filter 31 and amplifier 32. Therefore motor 33 is a speed-governed synchronous motor of high torque.

The impulse filtering circuit energizes disc 38 electrically whenever the circuit is broken by the transmitting cylinder 12, thereby causing a current to flow from contact 41 thru band 38 and some one of contacts 39 thru the paper to a ground 42 under the paper thereby generating a graph line for each contact 14 of the transmitter. Since the order in which the telemetered conditions are fed to the transmitting cylinder 12 is known, it is evident that such order will be preserved, although none of the conditions is entitled to be called the start or the finish of the series. If the identity of one of the conditions is recognizable from the kind of graph obtained, then all simultaneous graph lines will be identifiable from their positions in relation to the first. If no graph is sufficiently characteristic to identify a telemetered condition from it, the position of one of the graphs in the series can be determined by disconnecting all contacts 14 except one, telemetering that one locating its graph and then re-connecting the rest of the contacts 14.

In order to measure the passage of time on the graph, the presence in the circuit of timer 37 is necessary. By sending out a signal of some duration at spaced intervals, a line can be drawn on the paper which is indicative of elapsed time and is readily distinguishable from other impulse marks.

By a slight modification of the transmitting circuit, the necessity for grounding the shaft 11 or the helix 13 can be avoided. In such modification, the contacts 14 are connected into the grid circuit of the transmitter to bias the grids negatively upon either making or breaking contact with helix 13. An action is thus achieved which has the effect of momentarily blocking the output of the set instead of diverting that output to ground. Any competent electronic engineer in possession of this disclosure can make this modification. It is indicated in Fig. 1 by the dotted line in the antenna circuit, which line does not carry current when the transmitter is being operated to be intermittently grounded to generate signal. When signal is to be blocked, not grounded, the dotted line would carry full output, but lead 23b would be eliminated.

RECORDER—ACTUAL CONSTRUCTION

The construction below described lends itself especially well, on account of its compactness, to installation aboard a "mother" aircraft, i. e. one which accompanies the flight of a test model.

A base 150 is provided with form uprights each pair of which support a right angled slotted frame 152. A crosspin 153 in each frame forms the axle of each pulley 46 and 47 respectively. The inverter 33 is arranged to drive pulley 47 by means of a worm 154 and worm wheel 155, the latter being mounted on axle 153. Between the frames 152 is a threaded spacing bar 157 having an internally threaded collar 158. By this means the length of the bar can be adjusted to regulate the tightness of band 38 over pulleys 46—47.

Supporting a roll of current sensitive paper 44, there is a box-like sheet metal structure 159 behind the left frame 152. Paper for this roll passes under pulley 47 and band 38 and thru a sheet metal housing 160. The latter supports a flattening idler roll 161. A synchronous motor 162 is arranged to drive the paper thru slots 163 in its margin by means of sprockets 43.

The invention claimed is:
1. In a telemetering system, a radio transmitter, a monotone generator, means for modulating the carrier wave transmitted by the transmitter by the tone generator, a rotary switch of the drum type adapted to key the output wave generated by said transmitter said switch comprising a non-conducting cylinder, a conductive helix disposed on the cylindrical surface thereof, a surrounding non-conducting cylinder for said drum having a plurality of circumferentially incomplete passages longitudinally disposed therethrough, slidable contacts arranged in said passages and in contact with the outer cylindrical surface of said drum, means for individually varying the position of said contacts longitudinally along the surface of the drum in accordance with conditions to be telemetered, a motor arranged to drive said rotary switch, a shaft for said motor, said switch and said generator being mounted thereon to rotate at the same speed.

2. A system according to claim 1 in which the rotary switch is arranged to ground the audio component of transmitter output for an extremely short time at instants determined by the position of the contacts in regard to a dimension of said switch.

3. In a telemetering apparatus, a radio transmitter, tone generating means connected and adapted to modulate the output of said transmitter, rotary means comprising a non-conducting cylinder, a conductive helix disposed on said cylinder, a plurality of contacts movable longitudinally in response to conditions to be telemeter disposed about said cylinder and capable of making and breaking contact with said helix, a shaft driving both the cylinder and the tone generating means, a transmitter output circuit in which said movable contacts are included, said means together constituting an apparatus capable of transmitting a tone modulated carrier wave divided by short time intervals during which no audio component of the carrier wave is transmitted, said intervals being spaced proportionally to the setting of said contacts with respect to the longitudinal dimension of said cylinder.

4. In a telemetering device, a transmitter comprising a cylindrical drum of non-conducting material, a central shaft therefor, an inlaid helix of conductive wire in the surface of said drum, a housing for said drum which comprises a hollow cylinder of non-conductive material, the walls of said cylinder having a multiplicity of longitudinally bored cylindrical passages, slidable contacts within said passages, means for attaching each of said contacts to force to be telemetered, a motor for rotating said drum, a high frequency self-excited tank circuit arranged thru the inlaid wire on said drum and adapted to be interrupted for extremely short periods of time by said slidable contacts, said circuit including a high frequency oscillator tube, a tank coil and a tone generator, said generator comprising two substantially abutting spur gears insulated from each other, one being so mounted as to be stationary and the other revolubly mounted on the drum shaft, the gears being electrically so connected as to act as a variable condenser.

5. A system according to claim 1 in which the variable-position contacts are connected into the grid circuit of the radio transmitter to bias the grids thereof negatively upon the variable-position contacts either making or breaking contact with the rotary switch.

6. In a telemetering system; a transmitter comprising a radio transmitter capable of transmitting a carrier wave, means for modulating the carrier wave and means for interrupting said modulated carrier wave in response to a condition outside said transmitter which condition is to be telemetered, said means comprising a drum of non-conducting material, a conductive helix inlaid in said drum, a surrounding non-conductive cylinder for said drum having a plurality of circumferentially incomplete passages longitudinally disposed therethrough, an insulating wall for one end of said drum, a drive shaft extending through said drum and said wall, coil springs anchored to said wall, slidable contacts attached to said coil springs and arranged in said passages, said contacts being disposed to contact said drum and mechanical wire connections between said contacts and instruments indicating the conditions to be telemetered.

ROBERT A. COLE.
DONALD I. SMITH.

REFERENCES CITED

The following references are of record in the file of this patent:

UNITED STATES PATENTS

| Number | Name | Date |
|---|---|---|
| 463,852 | Bradley | Nov. 24, 1891 |
| 2,321,971 | Becker | June 15, 1943 |
| 2,328,054 | Chappell | Aug. 31, 1943 |
| 2,342,171 | Turner | Feb. 22, 1944 |
| 2,402,973 | Moore | July 2, 1946 |